# United States Patent Office 3,513,225
Patented May 19, 1970

3,513,225
MAR-RESISTANT POLYESTER RESINS
Allan Ellis Sherr, Martinsville, N.J., assignor to American Cyanamid Company, Stamford, Conn., a corporation of Maine
No Drawing. Filed Apr. 25, 1968, Ser. No. 724,289
Int. Cl. C08f 21/02
U.S. Cl. 260—872          3 Claims

ABSTRACT OF THE DISCLOSURE

A polyester resin composition composed of (1) the esterification reaction product of fumaric acid, triethylene glycol and 2-ethyl-1,3-hexanediol, (2) styrene, (3) an ethylene glycol dimethacrylate and (4) methyl methacrylate, and lenses produced therefrom, are disclosed.

BACKGROUND OF THE INVENTION

Polyester resin compositions similar to those disclosed herein have been the subject of various U.S. patents, see, for example, U.S. Pats. Nos. 3,264,372; 3,265,763; 3,265,764; 3,294,867; 3,318,975. The properties of the resins of said patents are excellent for the purposes disclosed, however, the resins are usually not of sufficient quality to enable them to be used for the production of high grade optical lenses. I have now discovered a specific polyester resin system which may be utilized, as such, in the production of optical lenses. My novel system can be formed into lenses which are haze-free, transparent (optically clear), grindable, shatter-resistant and mar-resistant and additionally, the lenses are not brittle and have a refractive index ($n_D^{25}$) of greater than 1.5 and approaching that of optical quality glass. This unique combination of properties cannot be found in resin systems known in the prior art.

SUMMARY

As mentioned above, my novel compositions are useful in the production of lenses. These lenses can be used in instruments such as binoculars, telecsopes, microscopes, etc., but are more particularly useful as ophthalmic lenses such as in eyeglasses, industrial safety glasses, sunglasses, etc.

DESCRIPTION OF THE INVENTION INCLUDING PREFERRED EMBODIMENTS

The compositions of the instant invention are composed of (1) from about 65.0% to about 75.0% of the esterification reaction product of fumaric acid, triethylene glycol and from about 1.0% to about 10.0%, based on the OH content of the triethylene glycol, of 2-ethyl-1,3-hexanediol, (2) from about 1.0% to about 5.0% of styrene, (3) from about 18.0% to about 22.0% of an ethylene glycol diamethacrylate and (4) from about 2.0% to about 6.0% of methyl methacrylate, said percentages being by weight, based on the total weight of (1), (2), (3) and (4).

The esterification reaction product of the fumaric acid, triethylene glycol and 2-ethyl-1,3-hexanediol is produced by merely reacting the components, under known conditions, in equimolar amounts of acid and alcohol or from about a 5% to 20% excess of alcohol over that amount stoichiometrically calculated to esterify the carboxyl groups of the acid. The esterification should only be carried out, however, until an acid number of below about 30, preferably between about 5 and about 30, is achieved.

The second component (2) of my novel compositions is styrene. This component is present in the amounts mentioned above as a mixture with component (1) until the ultimate composition is converted to the thermoset state.

The third component (3) of my novel composition is an ethylene glycol dimethacrylate. This component is also present in the initial, formable composition as a mixture with (1) and (2) and includes ethylene glycol dimethacrylate, diethylene glycol dimethacrylate, triethylene glycol dimethacrylate, tetra-ethylene glycol dimethacrylate, etc., see above patents.

The fourth component (4) of the composition of the present invention is methyl methacrylate. As with components (2) and (3), this component is also present as a mixture in the curable composition.

The styrene and methyl methacrylate components are utilized to cross-link the system in a cooperative manner while the ethylene glycol dimethacrylate aids in the cross-linking but also functions to reduce the density thereof and therefore produce a less brittle thermoset material.

The conversion of the thermosetting mixture to the thermoset composition can be accomplished by the application of heat and/or pressure with or without catalysis. Alternatively, the thermosetting material can be converted to the thermoset state by use of catalysts or initiators only, without resorting to either heat or pressure. The catalytic materials or polymerization initiators which may be used to make such a conversion in state are well-known in the art and have been used extensively for this purpose. Illustrative catalysts include the peroxide catalysts, such as benzoyl peroxide, tertiary butyl hydroperoxide, ditertiary butyl peroxide, and cumene hydroperoxide, among many others. The ketone peroxides may also be used, such as, the methyl ethyl ketone peroxide, the diethyl ketone peroxide and the like. The amount of the catalytic material used is conventional, i.e., between about 0.01% and 10%, and more, usually between about 0.1% and 3%, by weight, based on the weight of the total weight of (1), (2), (3) and (4).

As can be ascertained from a perusal of the above cited patents, it is known that glycol diacrylates and styrenes can be added to esterification reaction products similar to those disclosed above. I have found, however, that the use of an ethylene glycol dimethacrylate and styrene per se, in conjunction with methyl methacrylate produces thermoset formulations which possess a unique combination of optimum properties not attainable by a haphazard selection of individual materials from a myriad of available materials.

If desired, the compositions of the present invention may have incorporated therein, materials which do not function so as to destroy the properties above discussed. For example ultraviolet light absorbers, photochromic materials, dyes, pigments, mold release agents, foam reducing agents, etc. may be added in amounts such that they function as desired without destroying other existing, more desirable characteristics of the basic system.

The following examples are set forth for purpose of illustration only and are not meant to be construed as limitations on the present invention except as set forth in the appended claims. All parts and percentages are by weight unless otherwise specified.

POLYESTER RESIN A

Into a suitable reaction vessel equipped with thermometer, stirrer and inert gas inlet and outlet tubes, are introduced 619 parts of triethylene glycol, 580 parts of fumaric acid and 206 parts of 2-ethyl-1,3-hexanediol. The charge is heated at about 150° C. to 200° C. for 28 hours while bubbling carbon dioxide through the reaction mixture so as to provide an inert atmosphere. At the end of the reaction period, a light yellow viscous product having an acid number of 28 is recovered.

EXAMPLE 1

Into a suitable mixing vessel are charged 70.25 parts of "Resin A," 3 parts of styrene, 20 parts of tetraethylene glycol dimethylacrylate and 4 parts of methyl methacrylate. The charge is thoroughly blended and is then catalyzed by the addition of 1.5 parts of t-butyl peroctoate and 0.25 part of isopropyl percarbonate. The resulting composition is then poured into a casting cell composed of two 75 mm. diameter glass plates having a 6 base radius of curvature and sealed by a flexible gasket. The cell is then placed into an oven and heated at 149° F. for 2 hours, 230° F. for 40 minutes and 250° F., for 15 minutes. After further gradual heating to 135° C. the cell is removed and opened. A clear transparent lens of 6 base curvature having a Barcol Hardness of 25, a mar-resistance of 0.0,[1] a refractive index ($n_D^{25}$) of 1.519 and a transmission of 90.9%. The lens is useful, as such, or as a grindable lens for eyeglasses.

EXAMPLE 2

Following the procedure of Example 1, various compositions are produced with the following formulations of polyester resin, ethylene glycol dimethacrylate, methyl methacrylate and styrene. In each instance, curing of the mixture, (remaining amount being catalyst) in a lens-shaped cell results in articles of manufacture with properties substantially equivalent to those set forth in Example 1.

2(a) A mixture of 65.0 parts of a polyester composed of fumaric acid, triethylene glycol and 10% of 2-ethyl-1,3-hexanediol, having an acid number of 18, 5 parts of styrene, 22 parts of tetraethylene glycol dimethacrylate and 2 parts of methyl methacrylate. 0.05 part of isopropyl percarbonate is used instead of that amount of Example 1.

2(b) A mixture of 75.0 parts of a polyester composed of fumaric acid, triethylene glycol and 1% of 2-ethyl-1,3-hexanediol, acid No. 12, 1 part of styrene, 18 parts of tetraethylene glycol dimethacrylate and 6 parts of methyl methacrylate. 4.63 parts of t-butyl peroctoate were used and no isopropyl percarbonate. The system was cured 14½ hours at 149° F., 45 minutes at 216° F. and 30 minutes at 260° F. and opened after gradual heating to 135° C.

2(c) The same mixture of ingredients of Example 1 except that 20 parts of diethylene glycol dimethacrylate are substituted for the tetraethylene glycol dimethacrylate.

2(d) The same mixture of ingredients of Example 1 except that 20 parts of triethylene glycol dimethacrylate are substituted for the tetraethylene glycol dimethacrylate.

2(e) The same mixture of ingredients of Example 1 except that 20 parts of ethylene glycol dimethacrylate are substituted for the tetraethylene glycol dimethacrylate and the system is cured according to Example 2(b).

The lenses of Examples 1-2(e) were ground down by an optician to a lens having a prescription of +1.0—.75L and +1.25—.62R, inserted into eyeglass frames and fitted to a wearer. The glasses satisfactorily corrected the vision of the wearer.

What is claimed is:

1. A composition of matter consisting essentially of a blend of (1) from about 65.0% to about 75.0% of the esterification reaction product of reactants consisting essentially of fumaric acid, triethylene glycol and 1–10%, by weight, based on the OH content of the triethylene glycol, of 2-ethyl-1,3-hexanediol wherein said product has an acid number between about 5 and about 30, (2) from about 1.0% to about 5.0% of styrene, (3) from about 18.0% to about 22.0% of an ethylene glycol dimethacrylate and (4) from about 2.0% to about 6.0% of methyl methacrylate, said percentages being by weight, based on the total weight of (1), (2), (3) and (4).

2. The composition of claim 1 in a cured, crosslinked state.

3. An ophthalmic lens produced from the composition of claim 2.

References Cited

UNITED STATES PATENTS

| 3,042,651 | 7/1962  | Martens        | 260—872 |
| 3,264,372 | 8/1966  | Deichert et al. | 260—872 |
| 3,265,763 | 8/1966  | Deichert et al. | 260—872 |
| 3,265,764 | 8/1966  | Deichert et al. | 260—872 |
| 3,294,867 | 12/1966 | Bristol et al. | 260—868 |
| 3,318,975 | 5/1967  | Deichert et al. | 260—872 |
| 3,333,023 | 7/1967  | Bristol et al. | 260—872 |
| 3,391,224 | 7/1968  | Sherr et al.   | 260—872 |
| 3,431,321 | 3/1969  | De Lapp et al. | 260—872 |

WILLIAM H. SHORT, Primary Examiner

M. GOLDSTEIN, Assistant Examiner

U.S. Cl. X.R.

351—159, 177

---

[1] See U.S. Pat. No. 3,289,458.